(12) United States Patent
Park (10) Patent No.: US 9,257,689 B2
(45) Date of Patent: Feb. 9, 2016

(54) BATTERY PACK

(71) Applicant: Samsung SDI Co., Ltd., Yongin, Gyeonggi-do (KR)

(72) Inventor: Sang-Hun Park, Yongin (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 296 days.

(21) Appl. No.: 13/827,218

(22) Filed: Mar. 14, 2013

(65) Prior Publication Data

US 2014/0050968 A1   Feb. 20, 2014

(30) Foreign Application Priority Data

Aug. 20, 2012   (KR) .................. 10-2012-0090757

(51) Int. Cl.
*H01M 2/02* (2006.01)
*H01M 2/04* (2006.01)
*H01M 2/08* (2006.01)
*H01M 2/10* (2006.01)

(52) U.S. Cl.
CPC .................................. *H01M 2/1061* (2013.01)

(58) Field of Classification Search
USPC ............... 429/149–160, 163–187, 96–100; 29/623.1–623.5
See application file for complete search history.

(56) References Cited

U.S. PATENT DOCUMENTS 5,707,757 A * 1/1998 Lee .................................. 429/86
7,348,762 B2 * 3/2008 Hiratsuka et al. ............. 320/134

FOREIGN PATENT DOCUMENTS

JP   2011-076868 A   4/2011
KR   2011-0107526 A   10/2011
KR   2011-0118195 A   10/2011

* cited by examiner

*Primary Examiner* — Basia Ridley
*Assistant Examiner* — Caitlin Wilmot
(74) *Attorney, Agent, or Firm* — Knobbe Martens Olson & Bear, LLP (57) ABSTRACT

A battery pack includes one or more bare cells and an exterior member. Each of the bare cells has a pair of long side surfaces opposite to each other, and short side surfaces that connect the long side surfaces. The exterior member is composed of an adhesive layer provided adjacent to the bare cells while surrounding a portion of the bare cells, and a base material layer provided on the adhesive layer. In the battery pack, the adhesive layer has one or more openings therein, and the opening is provided adjacent to a portion at which the long and short side surfaces of the bare cell come in contact with each other.

16 Claims, 6 Drawing Sheets

BATTERY PACK

RELATED APPLICATIONS

This application claims priority to and the benefit of Korean Patent Application No. 10-2012-0090757, filed on Aug. 20, 2012, in the Korean Intellectual Property Office, the entire content of which is incorporated herein by reference.

BACKGROUND

1. Field

An aspect of the present invention relates to a battery pack, and more particularly, to a battery pack capable of improving process efficiency using a new member.

2. Description of the Related Art

Recently, battery packs have been variously used as power sources of portable electronic devices. As the portable electronic devices are used in various fields, demands on battery packs are increased. The battery packs can be charged/discharged a plurality of times, and accordingly are economically and environmentally efficient. Thus, the use of the battery packs is encouraged.

As the small size and light weight of electronic devices are required, the small size and light weight of battery packs are also required. Thus, an exterior case of a battery pack is manufactured using a material having the thickness of a thin film. However, a defect frequently occurs in the exterior appearance of the battery pack, and therefore, degradation of process efficiency, etc. occurs. Accordingly, a variety of studies have been conducted to develop a battery pack that can prevent the occurrence of a defect in manufacturing of the battery pack while being implemented as a small and light battery pack.

SUMMARY

Embodiments provide a battery pack provided with a new member.

Embodiments also provide a battery pack capable of improving process efficiency by reducing a defect of the exterior appearance thereof.

According to an aspect of the present invention, there is provided a battery pack including: one or more bare cells each having a pair of long side surfaces opposite to each other, and short side surfaces that connect the long side surfaces; and an exterior member composed of an adhesive layer provided adjacent to the bare cells while surrounding a portion of the bare cells, and a base material layer provided on the adhesive layer, wherein the adhesive layer has one or more openings therein, and the opening is provided adjacent to a portion at which the long and short side surfaces of the bare cell come in contact with each other.

The exterior member may include one or more first surfaces that face the long side surfaces of the bare cells, and a second surface connected to the first surface so as to correspond to the short side surface of the bare cell.

The opening may be provided in the first surface at the portion at which the first and second surfaces come in contact with each other.

The exterior member may include one first surface and a plurality of second surfaces connected to the first surface while being spaced apart from one another.

The exterior member may further include guide portions respectively corresponding to boundaries of the first and second surfaces.

One or more of corners of the exterior member may be chamfered.

The bare cells may be arranged in parallel so that the short side surfaces of adjacent bare cells come in contact with each other. The battery pack may further include a frame that accommodates the bare cells, wherein the frame is provided to have a shape corresponding to the outermost shape of the arranged bare cells.

The frame may include a base portion that supports the bare cells while facing the long side surfaces of the bare cells, and a side portion provided to have a size corresponding to that of the short side surface of the bare cell while being connected to the base portion.

The first surface of the exterior member may be provided to face the base portion of the frame, and the second surface of the exterior member may overlap with the side portion of the frame.

The opening of the adhesive layer may be provided to correspond to an end of the side portion of the frame.

The base portion may be provided with one or more accommodating portions that accommodate the bare cells, and the accommodating portion may be provided to have a shape corresponding to the long side surface of the bare cell.

The accommodating portions may be spaced apart from one another, and a side surface of the accommodating portion may be inclined.

A surface roughness may be provided on the long side surface of the bare cell. The surface roughness may be provided to correspond to the opening.

As described above, according to the present invention, it is possible to provide a battery pack provided with a new member.

Further, it is possible to provide a battery pack capable of improving process efficiency by reducing a defect of the exterior appearance thereof.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, an exemplary embodiment of the present invention will be described in detail with the accompanying drawings.

Figure 1:
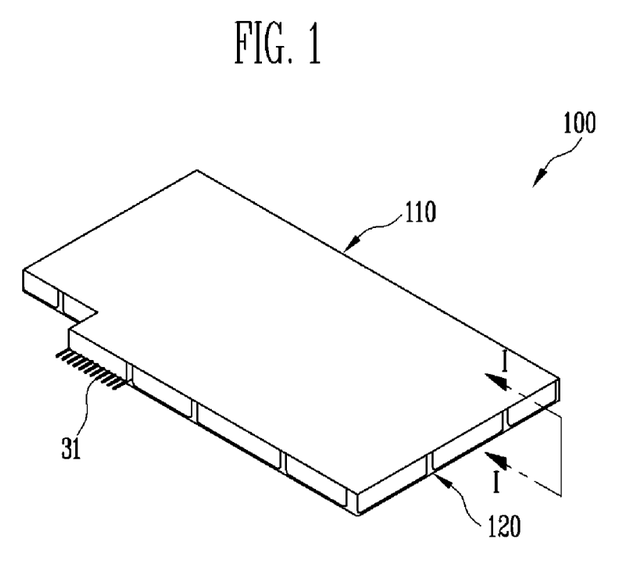
FIG. 1 is a perspective view of a battery pack according to an embodiment of the present invention.
Figure 2:
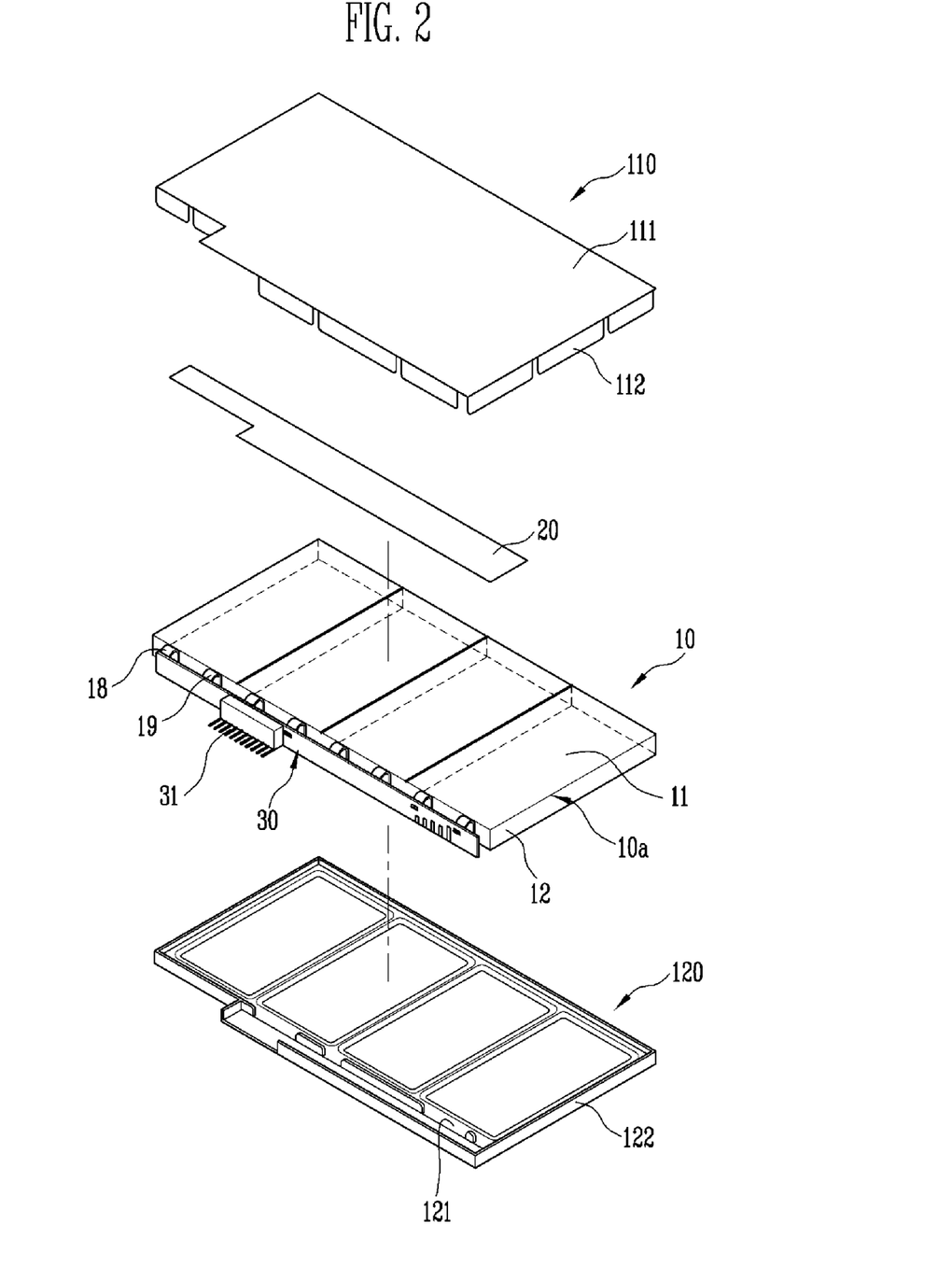
FIG. 2 is an exploded perspective view of the battery pack of FIG. 1.

FIG. 1 is a perspective view of a battery pack according to an embodiment of the present invention. FIG. 2 is an exploded perspective view of the battery pack of FIG. 1.

The battery pack 100 according to this embodiment includes one or more bare cells 10 each having a pair of long side surfaces 11 opposite to each other and short side surfaces that connect the long side surfaces 11; and an exterior member 110 that surrounds at least a portion of the bare cells 10, and is composed of an adhesive layer provided adjacent to the bare cell 10 and a base material layer provided on the adhesive layer. The adhesive layer includes one or more openings, and the opening may be provided adjacent to a portion at which the long and short side surfaces 11 and 12 of the bare cell 10 come in contact with each other.

The exterior member 110 may include one or more first surfaces 111 that face the long side surfaces 11 of the bare cells 10 and a second surface 112 connected to the first surface 110 so as to face the short side surface 12 of the bare cell 10.

The bare cell 10 may be a secondary battery that can be repetitively charged and discharged. For example, the bare cell 10 may be a prism type or pouch type bare cell. Positive and negative electrode tabs 18 and 19 are provided to the bare cell 10 so that the bare cell 10 can be electrically connected to a protective circuit module 30 through the positive and negative electrode tabs 18 and 19. A connector 31 is provided to the protective circuit module 30, and the bare cell 10 can transfer electric energy to an external device through the connector 31. The battery pack 100 may further include an insulation member 20 that electrically insulates the protective circuit module 30 by covering the side of the protective circuit module 30 after the protective circuit module 30 and the bare cells are mounted in a frame 120.

The battery pack 100 according to this embodiment may be composed of one or more bare cells 10. For example, the bare cells 10 may be arranged in parallel so that the short side surfaces 12 of adjacent bare cells 10 come in contact with each other. However, the arrangement of the bare cells 10 may be variously modified according to the design of the battery pack 100, and the present invention is not limited thereto. The battery pack 100 further includes the frame 120 that accommodates the bare cells 10, and the frame 120 may be provided to have a shape corresponding to the outermost shape of the arranged bare cells 10.

The frame 120 may include a base portion 121 that supports the bare cell 10 while facing the long side surface 11 of the bare cell 10, and a side portion 122 provided to have a size corresponding to that of the short side surface 12 of the bare cell 10 while being connected to the base portion 121. For example, the frame 120 may be provided in a box shape having an opened side, and the size of the inside of the box shape may be provided to correspond to that of the arranged bare cells 10.

After the bare cells 10 are mounted in the frame 120, the exterior member 110 may be provided on the bare cells 10. In this case, the first surface 111 of the exterior member 110 may be provided to face the base portion 121 of the frame 120, and the second surface 112 of the exterior member 110 may overlap with the side portion 122 of the frame 120. Therefore, any one of the pair of long side surfaces 11 of the bared cell 10 comes in contact with the base portion 121 of the frame 120, and the other of the pair of long side surfaces 11 of the bare cell 10 is covered by the first surface 111 of the exterior member 110.

Hereinafter, components of the battery pack according to this embodiment will be described in detail with reference to FIGS. 3 to 5.

Figure 3A:
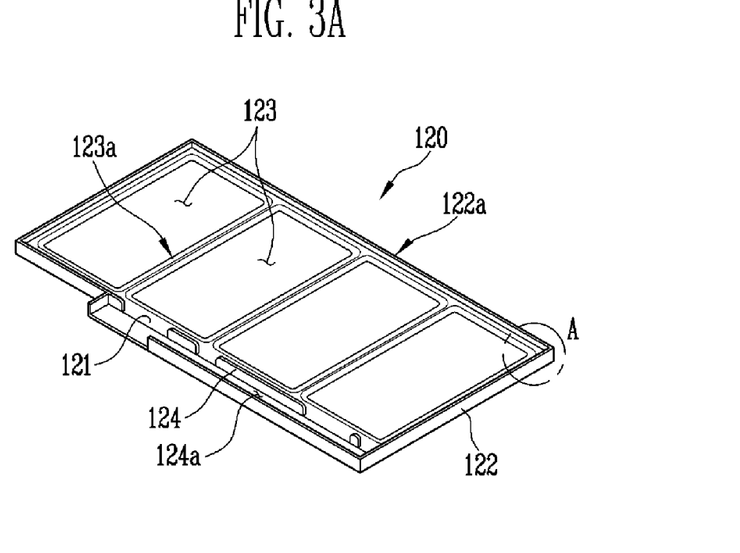
FIG. 3A is a perspective view of a frame of FIG. 2.

FIG. 3A is a perspective view of a frame of FIG. 2. FIG. 3B is an enlarged view of portion A of FIG. 3A. FIG. 3C is a sectional view taken along line II-II of FIG. 3B.

Figure 3B:
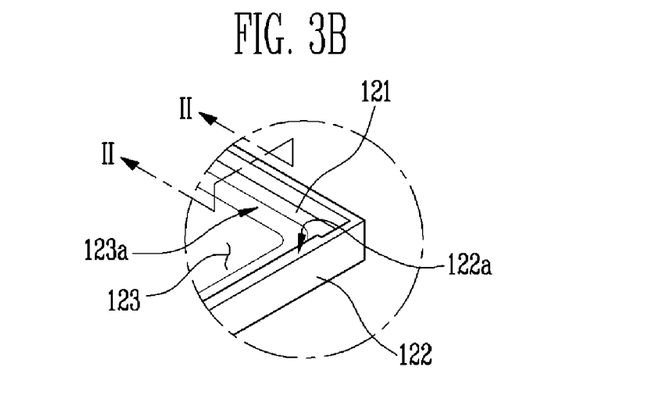
FIG. 3B is an enlarged view of portion A of FIG. 3A.
Figure 3C:
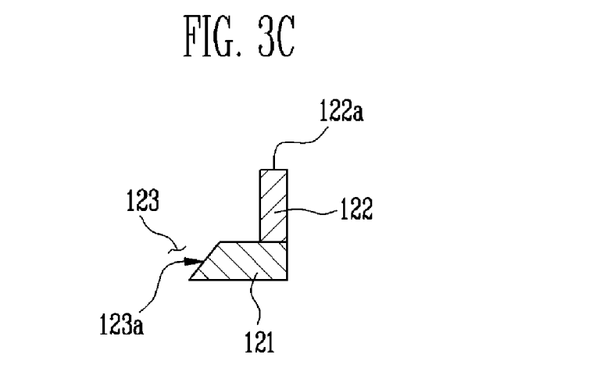
FIG. 3C is a sectional view taken along line II-II of FIG. 3B.

Referring to FIGS. 3A to 3C, the frame 120 may have a shape corresponding to the outermost shape of the arranged bare cells so as to fix arranged bare cells. The frame 120 may include a base portion 121 that supports the long side surface of the bare cell and a side portion 122 that comes in contact with the short side surface of the bare cell while being approximately vertically connected to the base portion 121. The base portion 121 may be provided with one or more accommodating portions 123 that accommodate the bare cells.

The accommodating portion 123 may be provided, for example, in the shape of a groove or hole so as to accommodate at least a portion of the bare cell while facing the long side surface of the bare cell. The accommodating portion 123 may be provided to correspond to the number of the arranged bare cells. In a case where the accommodating portion 123 is provided with a plurality of the accommodating portions, the accommodating portions 123 may be provided while being spaced apart from one another. A side surface 124 of the accommodating portion 123 may be inclined to come in contact with the side surface of the bare cell.

A partition wall 123a may be provided at one side of the frame 120 so as to block one side of the accommodating portion 123. The partition wall 123a may be provided with a plurality of partition walls arranged in parallel while being spaced part from one another. The protective circuit module connected to the bare cell may be mounted in a space portion 124a formed by the partition wall 124.

Figure 4A:
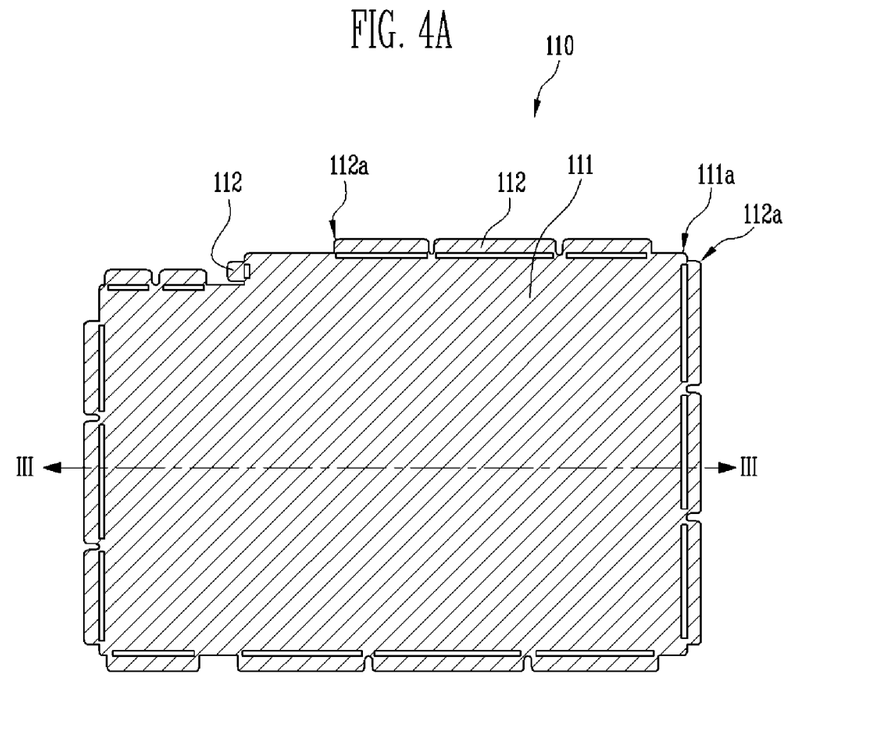
FIG. 4A is a plan view of an exterior member of FIG. 2.

FIG. 4A is a plan view of an exterior member of FIG. 2. FIG. 4B is a sectional view taken along line of FIG. 4A.

Figure 4B:
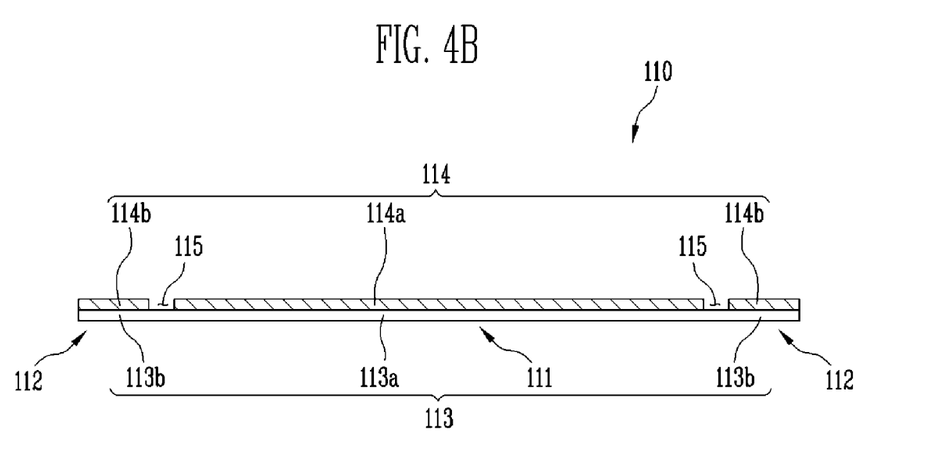
FIG. 4B is a sectional view taken along line of FIG. 4A.

Referring to FIGS. 4A and 4B, the exterior member 110 may include a first surface 111 that faces the long side surface of the bare cell and a second surface 112 connected to the first surface 111. The second surface 112 is bendable with respect to the first surface 111 so that the embodiment of FIG. 4, for example, can be formed into the embodiment of FIG. 2. The exterior member 110 may include one first surface 111 and a plurality of second surfaces 112 connected to the first surface 111 while being spaced apart from each other. The first surface 111 of the exterior member 110 is provided to a wide surface of the battery pack so as to enable the exterior appearance of the battery pack to have a desired look. Since the second surface 112 of the exterior member 110 is provided to a narrow surface of the battery pack, the second surface 112 does not have great influence on the exterior appearance of the battery pack. Therefore, the second surface 112 may be provided with a plurality of second surfaces spaced part from one another so that the plurality of second surfaces can be flexibly attached to correspond to the exterior appearance of the battery pack.

One or more of corners 111a and 112a of the exterior member 110 may be chamfered. The corner 111a of the first surface 111 and the corner 112a of the second surface 112 of the exterior member 110 are chamfered, so that it is possible to reduce a defect of the exterior appearance of the battery pack, which frequently occurs in manufacturing of the battery pack.

The exterior member 110 may be formed by laminating one or more layers. The section of the exterior member 110 may be composed of a base material layer 113 provided to the outermost surface of the battery pack and an adhesive layer 114 that comes in direct contact with at least a portion of the bare cell. That is, the first surface 111 of the exterior member 110 may be composed of a base material layer 113a and an adhesive layer 114a, and the second surface 112 of the exterior member 110 may also be composed of a base material layer 113b and an adhesive layer 114b.

One or more openings 115 may be provided in the adhesive layer 114. The opening 115 may be provided in the first surface 111 at a portion at which the first and second surfaces 111 and 112 come in contact with each other. For example, the opening 115 is provided in the adhesive layer 114a formed on the first surface so as to expose the base material layer 113a of the first surface 111.

Figure 5A:
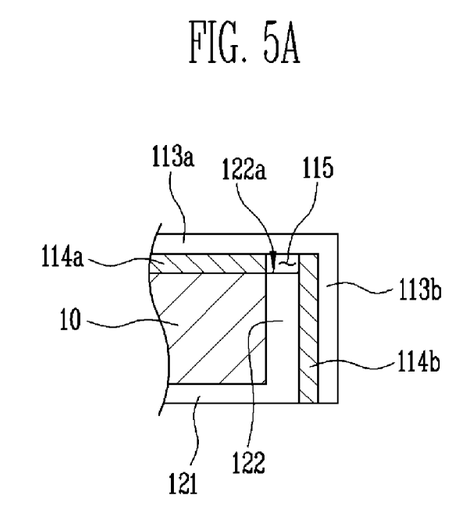
FIG. 5A is a sectional view taken along line I-I of FIG. 1.

FIG. 5A is a sectional view taken along line I-I of FIG. 1. FIG. 5B is a sectional view schematically showing a portion of a conventional battery pack.

Referring to FIG. 5A, in the battery pack according to this embodiment, the section of a portion at which the first and second surfaces 111 and 112 of the exterior member 110 are provided will be described. The opening 115 of the adhesive layer 114a of the first surface may be provided to correspond to an end 122a of the side portion 122 of the frame 120.

Figure 5B:
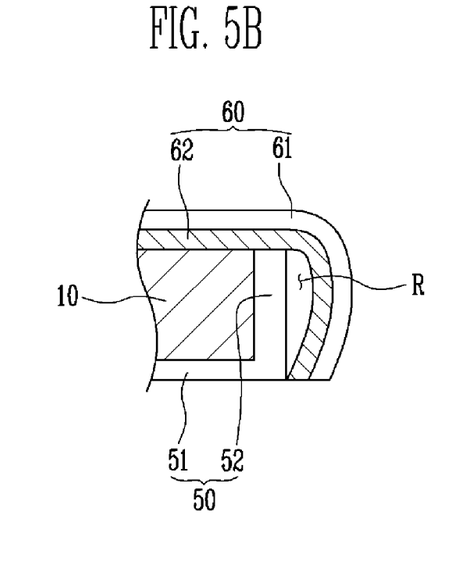
FIG. 5B is a sectional view schematically showing a portion of a conventional battery pack.

Referring to the sectional view of FIG. 5B, an exterior member 60 is provided at one side of a frame 50 in which a bare cell 10 of the conventional battery pack is accommodated. A second surface 62 of the exterior member 60 does not come in close contact with a side portion 52 of the frame 50, and is spaced apart from the side portion 52 with a tunnel-shaped space R interposed therebetween. This is not problematic because a first surface 61 of the exterior member 60 comes in contact with the bare cell 10 with a wide area in the battery pack. On the contrary, the second surface 62 of the exterior member 60 has a narrow attachment area, and requires a predetermined strength and thickness so as to be used for the exterior member 60 of the battery pack. Therefore, the second surface 62 of the exterior member 60 is not firmly attached to the side portion 52 of the frame 50, and is easily detached from the side portion 52 of the frame 50, which causes a defect of the exterior appearance of the battery pack. Accordingly, process efficiency is degraded in the manufacturing of the battery pack.

On the other hand, in the battery pack according to this embodiment, the opening 115 is provided in the adhesive layer 114a of the first surface 111 so as to be adjacent to boundaries of the first and second surfaces 111 and 112 of the exterior member 110. The opening 115 is provided to corresponding to the end 122a of the side portion 122 of the frame 120, so that it is possible to facilitate bending between the first and second surfaces 111 and 112. Since the elasticity of the adhesive layer 114, which is a property of the adhesive layer 114, can be restricted at a portion at which the first and second surfaces 111 and 112 are bent, the second surface 112 can come in close contact with the side portion 122 of the frame 120. Thus, in the battery pack according to this embodiment, there is formed no tunnel-shaped space R formed by detaching the second surface 112 from the side portion 122 of the frame 120, so that it is possible to prevent a defect of the exterior appearance of the battery pack and to improve process efficiency.

Hereinafter, other embodiments of the present invention will be described with reference to FIGS. 6 and 7. Contents of these embodiments, except the following contents, are similar to those of the embodiment described with reference to FIGS. 1 to 5B, and therefore, their detailed descriptions will be omitted.

Figure 6:
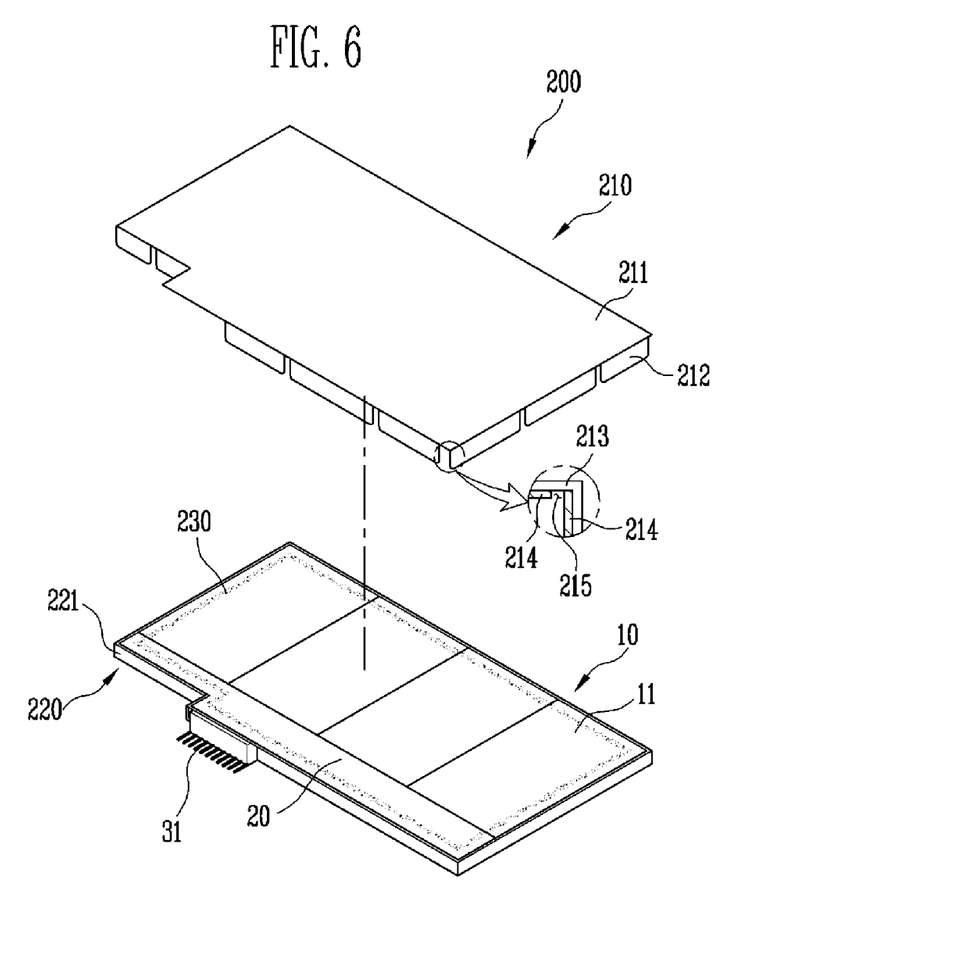
FIG. 6 is an exploded perspective view of a battery pack according to another embodiment of the present invention.

FIG. 6 is an exploded perspective view of a battery pack according to another embodiment of the present invention.

Referring to FIG. 6, the battery pack 200 according to this embodiment may include a frame 220 in which a plurality of bare cells 10 are arranged and mounted, and an exterior member 210 that covers one sides of the bare cells 10. The exterior member 210 may be composed of an adhesive layer 214 that comes in direct contact with the frame 220 and the bare cells 10, and a base material layer 213 provided to overlap with the adhesive layer 214. One or more openings 215 may be provided in the adhesive layer 214 so as to expose the base material layer 213 therethrough. The opening 215 may be provided to the side of a first surface 211 of the exterior member 210 at the boundaries of the first surface 211 and a second surface 212 of the exterior member 210.

A surface roughness 230 may be provided on a long side surface 11 of the bare cell 10. The surface roughness 230 may be provided to corresponding to the opening 215. The surface roughness 230 may degrade the adhesion of the adhesive layer provided on the first surface 211 of the exterior member 210. However, when the second surface 212 of the exterior member 210 is attached to a side portion 221 of the frame 220, it is possible to prevent the second surface 212 from being pulled toward the first surface 211. Thus, the second surface 212 can be firmly attached to the side portion 221 of the frame.

Figure 7:
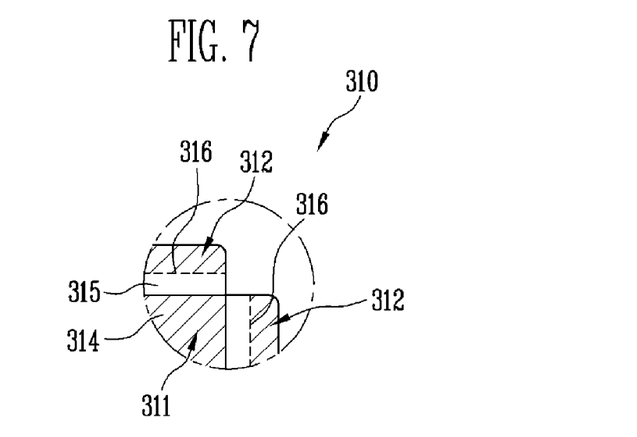
FIG. 7 is a sectional view schematically showing a portion of an exterior member according to still another embodiment of the present invention.

FIG. 7 is a sectional view schematically showing a portion of an exterior member according to still another embodiment of the present invention.

FIG. 7 is a view schematically showing one corner of an exterior member 310 according to this embodiment. The exterior member 310 may further include guide portions 316 respectively corresponding to boundaries of first and second surface 311 and 312. For example, the guide portions 316 may be a plurality of knife marks or folding lines provided while being spaced apart from each other. The guide portions 316 enable the first and second surfaces 311 and 312 to be easily bent. The guide portions 316 are provided to corners of a frame, so that it is possible to improve process efficiency of the battery pack.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack, comprising:
   At least one bare cell, each having a pair of long side surfaces opposite to each other, and short side surfaces that connect the long side surfaces; and
   an exterior member composed of an adhesive layer provided adjacent to the at least one bare cell while surrounding a portion of the at least one bare cell, and a base material layer provided on the adhesive layer, and wherein the exterior member comprises one or more first surfaces that face the long side surfaces of the at least one bare cell, and one or more second surfaces connected to the one or more first surfaces so as to correspond to the short side surfaces of the at least one bare cell that extends substantially perpendicular to the one or more first surfaces, wherein the adhesive layer has one or more openings therein, and the opening is provided adjacent to a portion at which the long and short side surfaces of the at least one bare cell come in contact with each other so that the opening is formed on the one or more first surfaces interposed between the adhesive of the one or more first surfaces and the adhesive of the one or more second surfaces, wherein the opening is co-planar with the adhesive of the one or more first surfaces and is extending in a direction substantially perpendicular to the one or more first surfaces.

2. The battery pack according to claim 1, wherein the exterior member comprises one first surface and a plurality of second surfaces connected to the first surface while being spaced apart from one another.

3. The battery pack according to claim 1, wherein the exterior member further comprises guide portions respectively corresponding to boundaries of the first and second surfaces.

4. The battery pack according to claim 1, wherein one or more of corners of the exterior member are chamfered.

5. The battery pack according to claim 1, wherein the at least one bare cells-comprise a plurality of bare cells that are arranged in parallel so that the short side surfaces of adjacent bare cells come in contact with each other, and the battery pack further comprises a frame that accommodates the bare cells, wherein the frame is provided to have a shape corresponding to the outermost shape of the arranged bare cells.

6. The battery pack according to claim 5, wherein the frame comprises a base portion that supports the bare cells while facing the long side surfaces of the bare cells, and a side portion provided to have a size corresponding to that of the short side surface of the bare cell while being connected to the base portion.

7. The battery pack according to claim 6, wherein the first surface of the exterior member is provided to face the base portion of the frame, and the second surface of the exterior member overlaps with the side portion of the frame.

8. The battery pack according to claim 6, wherein the opening of the adhesive layer is provided to correspond to an end of the side portion of the frame.

9. The battery pack according to claim 6, wherein the base portion is provided with one or more accommodating portions that accommodate the at least one bare cells, and the accommodating portion is provided to have a shape corresponding to the long side surface of the at least one bare cell.

10. The battery pack according to claim 9, wherein the accommodating portions are spaced apart from one another, and a side surface of the accommodating portion is inclined.

11. The battery pack according to claim 1, wherein a surface roughness is provided on the long side surface of the bare cell, and the surface roughness is provided to correspond to the opening.

12. an exterior member comprised of a base material layer and an adhesive layer, wherein the exterior member includes a base portion and at least one side portions that are positioned adjacent the at least one side portions of the frame and wherein at least one opening is formed in the adhesive layer in the base portion of the exterior member adjacent the position of at least one side portion of the frame and wherein the at least one side portions extends substantially perpendicular to the base portion and the at least one opening is positioned so that the hole is interposed between the adhesive of the at least one base portion and a portion of the adhesive of the at least one side portions, wherein the at least one opening is co-planar with the adhesive of the at least one base portion and is extending in a direction substantially perpendicular to the at least one base portion.

13. The battery pack of claim 12, further comprising guide portions respectively corresponding to boundaries between the base portion and the at least one side portion of the exterior member, wherein the guide portions permit the at least one side portion to be bent with respect to the base portion.

14. The battery pack of claim 12, wherein the exterior members define corners and wherein the corners are chamfered.

15. The battery pack of claim 12, wherein the at least one side portions of the exterior member comprise a plurality of discrete side portions connected to the base portion.

16. The battery pack of claim 12, wherein a surface roughness is provided on the long side surface of the bare cell that corresponds to the opening in the adhesive layer.

* * * * *